United States Patent
Suzuki et al.

[11] Patent Number: 5,976,401
[45] Date of Patent: Nov. 2, 1999

[54] AGENT FOR REMOVING PHOSPHATES, NITRATES AND NITRITES FROM WASTEWATER

[75] Inventors: Takashi Suzuki, Kofu; Toshio Sato, Matsue; Akira Ookubo; Tomohide Koizumi, both of Tokushima; Mikiko Mihara; Shoichi Oonishi, both of Naruto, all of Japan

[73] Assignee: Tomita Pharmaceutical Co., Ltd., Tokushima-Ken, Japan

[21] Appl. No.: 08/907,308

[22] Filed: Aug. 6, 1997

[30] Foreign Application Priority Data

Aug. 7, 1996 [JP] Japan ................... 8-208079
Nov. 11, 1996 [JP] Japan ................... 8-298999

[51] Int. Cl.$^6$ ................... C02F 1/42; C02F 5/08; C09K 3/00
[52] U.S. Cl. ................... 252/179; 210/683; 210/907; 252/184; 423/DIG. 14
[58] Field of Search ................... 252/179, 184; 210/907, 683; 423/DIG. 14

[56] References Cited

U.S. PATENT DOCUMENTS

| | | | |
|---|---|---|---|
| 3,002,932 | 10/1961 | Duwell et al. | 252/179 |
| 3,063,807 | 11/1962 | Kenworthy | 423/DIG. 14 |
| 4,536,294 | 8/1985 | Guillet et al. | 210/907 X |
| 4,642,193 | 2/1987 | Miyata et al. | 210/683 X |
| 4,935,146 | 6/1990 | O'Neill et al. | 210/684 |

FOREIGN PATENT DOCUMENTS

| | | |
|---|---|---|
| 0 222 475 | 1/1981 | European Pat. Off. . |
| 0 369 275 | 5/1990 | European Pat. Off. . |
| 61-064 388 | 4/1986 | Japan . |
| WO 90/05706 | 5/1990 | WIPO . |
| WO 91 19679 | 12/1991 | WIPO . |

OTHER PUBLICATIONS

Miyata et al.: Adsorption of $N_2$, $O_2$, $CO_2$ and $H_2$ on Hydrotalcite–Like System: $Mg^{2+}$–$Al^{3+}$–$(Fe(CN)_6)^{4-}$, *Clay and Clay Minerals*, vol. 26, no. 6, pp. 441–447 (1978).
European Search Report and annex for corresponding EPC Application No. EP 97 11 3595 Jan. 23, 1998.
English abstract of priority document DE 3838532, Derwent Information Ltd.
English abstract of WO priority document DE 4018628, Derwent Information Ltd.

*Primary Examiner*—Richard D. Lovering
*Attorney, Agent, or Firm*—Hardaway/ Mann IP Group

[57] ABSTRACT

A method for treating phosphate-containing waste water comprising treating phosphate-containing waste water with a metal hydroxide complex as a phosphate adsorbent represented by the formula:

$$M_{1-x}^{2+}M_x^{3+}(OH^-)_{2+x-y}(A^{n-})_{y/n}$$

wherein $M^{2+}$ is at least one divalent metal ion selected from the group consisting of $Mg^{2+}$, $Ni^{2+}$, $Zn^{2+}$, $Fe^{2+}$, $Ca^{2+}$ and $Cu^{2+}$; $M^{3+}$ is at least one divalent metal ion selected from the group consisting of $Al^{3+}$ and $Fe^{3+}$; $A^{n-}$ is an n-valent anion; x is in the range $0.1 \leq x \leq 0.5$; y is in the range $0.1 \leq y \leq 0.5$; and n is 1 or 2.

6 Claims, 3 Drawing Sheets

AGENT FOR REMOVING PHOSPHATES, NITRATES AND NITRITES FROM WASTEWATER

FIELD OF THE INVENTION

The invention relates to a method for treating waste water and an agent for treating waste water.

BACKGROUND ART

In recent years, organic materials and nutrients such as nitrates, nitrites, ammonia and phosphates which are contained in industrial effluent and domestic waste water in large amounts are pointed out as a cause of eutrophication leading to red tide in the estuaries and a cause of pollution of lakes by stimulating a multiplication of algae. It is said that the critical concentration of nitrogen compounds (nitrates and nitrites) and phosphates are 0.15 ppm and 0.02 ppm, respectively. The establishment of technology for removing such organic materials and nutrients from the region of higher concentration to the region of lower concentration are earnestly desired.

Methods for removing phosphates from waste water are divided roughly into biological treatment methods and physicochemical treatment methods. A coagulating sedimentation method using coagulant to remove phosphates as slightly soluble salts is a general method as physicochemical treatment methods from the viewpoint of economy and efficiency. These methods have been utilized in processes such as effusion of salts from coagulants to waste water, sludge treatment, recovery and recycle of phosphates, and insufficient removal of phosphates in the region of lower concentration thereof.

A method for adsorbing phosphates using a phosphate adsorbent to remove phosphates may also be accomplished. In carrying out the adsorption method, aluminum hydroxide gel, magnesium oxide, titanium oxide-active carbon complex, zirconium oxide-active carbon complex, volcanic ash soil and the like are examined as a phosphate adsorbent.

In recent years, a particularly noted water-related environmental problem has been the eutrophication in the closed water areas such as swamp and lakes, rivers and estuaries. The Japanese government has enacted laws to address this problem. Restrictions concerning the discharge of phosphates, has become more strict. The present process for treating waste water without dephosphorization is not enough to meet the new restriction with respect to phosphate. Therefore, an appropriate phosphate-treating step is needed. Under such background, a phosphate adsorbent capable of efficiently recovering and removing phosphates from waste water and capable of recycling phosphates from the viewpoint of effective use of resources is needed. In addition, a process for post-treatment of the phosphate adsorbent is needed. The inflow of phosphate-containing waste water from areas where there is sewage but no equipment for treating waste water or where there are limitations due to land form and straggling houses are major causes of eutrophication. Since treatment of waste water relies on a septic tank at each house in the area, an incorporation of a dephosphorization step in the phosphate-treatment procedure at a septic tank is important. In that case, a high-performance and renewable phosphate adsorbent is needed.

A 1.0 to 1.5 $m^3$ drain having a phosphate concentration of 5–500 ppm per month per general house is discharged in a farm area. With respect to a large-sized septic tank applied to a group of 10 people or more, phosphates may be removed by coagulation and sedimentation using coagulant containing iron salt or aluminum salt as a major ingredient. In contrast, with respect to a small-sized septic tank applied to a group of 5–10 people, a coagulant may not be substantially used to remove phosphates because of low efficiency, requiring a phosphate adsorbent. Conditions needed for the phosphate adsorbent applied to a small-sized septic tank are basically the same as a phosphate adsorbent applied to an equipment for waste water treatment. Since the septic tank may not be enlarged and frequency and cost of maintenance are important, the phosphate adsorbent should not demand enlargement of the small-sized septic tank or increase frequency and cost of maintenance. Further, removal of phosphates, nitrates and nitrites is preferred, since they also cause eutrophication. As the pressure for lower phosphate concentration increases it is important that methods be developed to decrease phosphate concentration to not more than 0.02 ppm, which is the critical concentration for the generation of red tide. Therefore, phosphate adsorbents which are useful for not only removal of phosphate from waste water with a higher phosphate concentration, but also from rivers with a lower phosphate concentration, need to be developed.

It is an object of the invention to provide a reasonable method for treating phosphate-containing waste water by a phosphate adsorbent having a large capacity of phosphates adsorption and recycling the phosphate adsorbent.

It is another object of the invention to provide an agent for treating waste water which is capable of removing phosphates and nitrites.

DISCLOSURE OF THE INVENTION

The invention provides the following method and agent for treating water waste water.

Item 1. A method for treating phosphate-containing waste water comprising treating phosphate-containing waste water with a metal hydroxide complex such as a phosphate adsorbent represented by formula (1):

$$M_{1-x}^{2+}M_x^{3+}(OH^-)_{2+x-y}(A^{n-})_{y/n} \qquad (1)$$

wherein $M^{2+}$ represents at least one divalent metal ion selected from the group consisting of $Mg^{2+}$, $Ni^{2+}$, $Zn^{2+}$, $Fe^{2+}$, $Ca^{2+}$ and $Cu^{2+}$; $M^{3+}$ represents at least one trivalent metal ion selected from the group consisting of $Al^{3+}$ and $Fe^{3+}$; $A^{n-}$ represents n-valent anion; $0.1 \leq X \leq 0.5$, $0.1 \leq y \leq 0.5$; and, n is 1 or 2.

Item 2. A method for treating phosphate-containing waste water according to item 1 comprising the steps of:

step (I): treating phosphate-containing waste water with a metal hydroxide complex as a phosphate adsorbent represented by formula (1):

$$M_{1-x}^{2+}M_x^{3+}(OH^-)_{2+x-y}(A^{n-})_{y/n} \qquad (2)$$

wherein $M^{2+}$ represents at least one divalent metal ion selected from the group consisting of $Mg^{2+}$, $Ni^{2+}$, $Ni^{2+}$, $Fe^{2+}$, $Ca^{2+}$ and $Cu^{2+}$; $M^{3+}$ represents at least one trivalent metal ion selected from the group consisting of $Al^{3+}$ and $Fe^{3+}$; $A^{n-}$ represents n-valent anion; $0.1 \leq x \leq 0.5$, $0.1 \leq y \leq 0.5$; and, n is 1 or 2; and step II: treating the phosphate-adsorbed phosphate adsorbent obtained in step (I) with at least one phosphate-desorbing agent selected from the group consisting of alkaline metal salts and alkaline metal carbonates and alkaline earth metal carbonates to regenerate and recycle the phosphate adsorbent.

Item 3. A method for treating phosphate-containing waste water according to item 1 comprising the steps of:

step (I): treating phosphate-containing waste water with a metal hydroxide complex as a phosphate adsorbent represented by formula (1):

$$M_{1-x}^{2+}M_x^{3+}(OH^-)_{2+x-y}(A^{n-})_{y/n} \tag{1}$$

wherein $M^{2+}$, $M^{3+}$, $A^{n-}$, x, y and n are as defined above.

step (Ia): treating the phosphate-adsorbed phosphate adsorbent obtained in step (I) with an aqueous solution containing an alkaline metal carbonate or an $A^{n-}$ ion to desorb and recover phosphates;

step (Ib): calcinating the phosphate adsorbent after dephosphorization of step (Ia) at about 430–600° C.;

step (II): treating the phosphate adsorbent after calcination with at least one phosphate-desorbing agent selected from the group consisting of alkaline metal salts and alkaline earth metal salts other than alkaline metal carbonates and alkaline earth metal carbonates to regenerate and recycle the phosphate adsorbent.

Item 4. A method for treating phosphate-containing waste water according to item 1 comprising the steps of:

step (I): treating phosphate-containing waste water with a metal hydroxide complex such as a phosphate adsorbent represented by formula (1):

$$M_{1-x}^{2+}M_x^{3+}(OH^-)_{2+x-y}(A^{n-})_{y/n} \tag{1}$$

wherein $M^{2+}$, $M^{3+}$, $A^{n-}$, x, y and n are as defined above.

step (Ia): treating the phosphate-adsorbed phosphate adsorbent obtained in step (I) with an aqueous solution containing an alkaline metal carbonate or an $A^{n-}$ ion to desorb and recover phosphates;

step (Ib): dissolving the phosphate-desorbed phosphate adsorbent in an acidic solution to recycle the solution as raw material for producing a phosphate adsorbent.

Item 5. A method for treating phosphate-containing waste water according to item 1 comprising the additional steps of:

step (III): treating the calcinated phosphate adsorbent obtained in step (Ib) of item 3 with phosphate-containing waste water; and step (IV) repeating the step (II) of item 2 or the steps (Ia), (Ib) and (II) of item 3 using the phosphate-adsorbed phosphate adsorbent obtain the step (III).

Item 6. A method of treating phosphate-containing waste water according to item 1 comprising dissolving the calcinated phosphate adsorbent obtained in step (Ib) of item 3 in an acidic solution to recycle the solution as raw material for producing a phosphate adsorbent.

Item 7. An agent for removing phosphates, nitrates and nitrites from waste water comprising a metal hydroxide complex as a phosphate adsorbent represented by formula (1):

$$M_{1-x}^{2+}M_x^{3+}(OH^-)_{2+x-y}(A^{n-})_{y/n} \tag{1}$$

wherein $M^{2+}$, $M^{3+}$, $A^{n-}$, x, y and n are as defined above.

Item 8. A granulate of phosphate adsorbent for treating phosphate-containing waste water comprising about 99–60% by weight of a metal hydroxide complex as a phosphate adsorbent represented-by formula (1):

$$M_{1-x}^{2+}M_x^{3+}(OH^-)_{2+x-y}(A^{n-})_{y/n} \tag{1}$$

wherein $M^{2+}$, $M^{3+}$, $A^{n-}$, x, y and n are as defined above and about 1–40% by weight of a binder.

Item 9. The granulate according to item 8 wherein said binder comprises an aminated polyacrylamide.

Item 10. The granulate according to item 8 wherein said binder comprises about 99–60% by weight of an aminated polyacrylamide and about 1–40% by weight of at least one selected from the group consisting of polyamide/epichlorohydrin resin, vinyl acetate/vinyl versate copolymer resin and styrene/acryl resin.

The metal hydroxide complex used in the invention is represented by formula (1):

$$M_{1-x}^{2+}M_x^{3+}(OH^-)_{2+x-y}(A^{n-})_{y/n} \tag{1}$$

wherein $M^{2+}$ represents at least one divalent metal ion selected from the group consisting of $Mg^{2+}$, $Ni^{2+}$, $Zn^{2+}$, $Fe^{2+}$, $Ca^{2+}$ and $Cu^{2+}$; $M^{3+}$ represents at least one trivalent metal ion selected from the group consisting of $Al^{3+}$ and $Fe^{3+}$; $A^{n-}$ represents n-valent anion; $0.1 \leq x \leq 0.5$, $0.1 \leq y \leq 0.5$; and, n is 1 or 2.

Divalent metal ions represented by $M^{2+}$ include $Mg^{2+}$, $Ni^{2+}$, $Zn^{2+}$, $Fe^{2+}$, $Ca^{2+}$ and $Cu^{2+}$, preferably $Mg^{2+}$ and $Ca^{2+}$. Trivalent metal ions represented by $M^{3+}$ include $Al^{3+}$ and $Fe^{3+}$, preferably $Fe^{3+}$.

$A^{n-}$ represents n-valent anion (n+1 or 2). $A^{n-}$ may consist of one or more monovalent ion, one or more divalent ion or both of monovalent ion(s) and divalent ion(s). When $A^{n-}$ includes a monovalent ion and a divalent ion, a molar ratio of the divalent ion is preferably less than a molar ratio of the monovalent ion. Monovalent anions include $OH^-$, $Cl^-$, $NO_2^-$, $NO_3^-$, $F^-$, $Br^-$, and $HCO_3^-$, preferably $Cl^-$. Divalent anions include $SO_4^{2-}$, $CO_3^{2-}$ and $SO_3^{2-}$, preferably $SO_4^{2-}$.

With respect to x, its values are usually $0.1 \leq x \leq 0.5$; preferably $0.25 \leq x \leq 0.4$; and more preferably $0.2 \leq x \leq 0.35$.

With respect to y, its values are usually $0.1 \leq y \leq 0.5$; preferably $0.2 \leq y \leq 0.4$; and more preferably $0.2 \leq y \leq 0.35$.

With respect to the compound of formula (1), divalent metal ions $M^{2+}$, trivalent metal ions $M^{3+}$ and a carbonate ion are determined by titration. A $Cl^-$ ion is determined by an ion meter provided with a chlorine ion selective electrode. $A^{n-}$ ions comprising $NO_2^-$, $NO_3^-$, $F^-$, $Br^-$, $HCO_3^-$ and like monovalent ions and $SO_4^{2-}$, $SO_3^{2-}$ and like divalent ions are determined by ion chromatography. The "y" value with respect to divalent ions is demonstrated by the measured mole value of $A^{2-}$. A molar ration of hydroxide ion $OH^-$ is calculated by using measured values of $M^{2+}$, $M^{3+}$ and $A^{n-}$ to electrically neutralize the metal hydroxide complex.

When phosphates, nitrates and nitrites should be removed simultaneously, monovalent ions of $A^{n-}$ may include halogen ions ($Cl^-$, $F^-$, $Br^-$) and a hydroxide ion except for $NO_2^-$ and $NO_3^-$. $Cl^-$ ion is most preferable from the viewpoint of environmental protection.

The metal hydroxide complex may be used individually or may be used as a mixture of two or more. With respect to shape thereof, the metal hydroxide complex may be used in the from of powder. However, the metal hydroxide complex is preferably in the form of granulate and filter medium. Binders for granulation are not specifically limited. The binders include polyamide/epichlorohydrin resin, vinyl acetate/vinyl versate copolymer resin, styrene/acryl resin and aminated polyacrylamides (eg. polyacrylic hydrazide) and like organic resin compounds; ethyl cellulose, carboxymethyl cellulose and like celluloses; carrageenan, and like polysaccharides. The organic resin compounds are preferably used. Binders preferably include organic resin compounds such as aminated polyacrylamide, more preferably aminated polyacrylamide.

Aminated polyacrylamide and other binders may be blended. Other binders blended with aminated polyacrylamide include at least one of polyamide/epichlorohydrin resin, vinyl acetate/vinyl versate copolymer resin and styrene/acryl resin.

When aminated polyacrylamide is used as a binder, a small amount of aminated polyacrylamide is enough to produce granulates with improved mechanical strength and phosphate adsorption capacity. In order to improve workability during granulation by lowering viscosity of the mixture, other binders such as polyamide/epichlorohydrin resin, vinyl acetate/vinyl versate copolymer resin and styrene/acryl resin are preferably combined with aminated polyacrylamide. Using the mixture of animated polyacrylamide with the polyamide/epichlorohydrin resin, vinyl acetate/vinyl versate copolymer resin or styrene/acryl resin as a binder makes it possible to produce granulates with improved properties such as mechanical strength, phosphate-adsorption capacity and workability. Binders may be added in an amount of about 1–40% by weight, preferably about 1–20% by weight, and more preferably about 1–10% by weight based on the total amount of granulates.

As a binder, a mixture of animated polyacrylamide with at least polyamide/epichlorohydrin resin, vinyl acetate/vinyl versate copolymer resin or styrene/acryl resin in an amount about 1–40% by weight, preferably about 1–20% by weight, and more preferably about 1–10% by weight, which is used based on the amount of animated polyacrylamide, may be used. A preferable method for producing granulates comprises adding a necessary amount of water to a mixture of about 99–60% by weight of a metal hydroxide complex and about 1–40% by weight of said binder composition; kneading the mixture sufficiently; and forming shaped particles with a granulator. Conventional kneaders and granulators may be used, however, kneaders provided with binary rotating shafts are preferable. With respect to granulators, upstroke-type extrusion granulators are preferably used. The shaped particles are dried and hardened to produce granulates of the invention. Drying and hardening are preferably carried out at at least the lowest temperature necessary for the binder to form membranes or to dry the granules. Drying below the membrane-forming temperature is possible when drying is conducted for an extended period.

The metal hydroxide complex of the invention used as a phosphate adsorbent may capture a phosphate ion by an anion exchange reaction between an n-valent anion (n=1 or 2) in the composition and a phosphate ion. The captured phosphate ion may be desorbed by using solutions of alkaline metal carbonates, alkaline metal salts or alkaline earth metal salts as a desorbing solution.

The phosphate ion desorbing solution is preferably an aqueous solution of alkaline metal carbonates or hydrogen carbonates, such as sodium carbonate, potassium carbonate, sodium hydrogen carbonate, potassium hydrogen carbonate, ammonium carbonate and lithium carbonate, but preferably sodium carbonate and sodium hydrogen carbonate. Aqueous alkaline metal solutions preferably include aqueous solutions of ammonium hydroxide, sodium hydroxide, potassium hydroxide, sodium chloride, potassium chloride, sodium fluoride, potassium fluoride, sodium bromide, potassium bromide, sodium sulfate, potassium sulfate, sodium sulfite and potassium sulfite, but more preferably sodium hydroxide and sodium chloride. Aqueous alkaline earth metal solutions preferably include aqueous solutions of magnesium chloride, calcium chloride, magnesium sulfate, magnesium bromide and calcium bromide, but more preferably magnesium chloride and magnesium sulfate. Treatment of a phosphate adsorbent with such a desorbing solution makes it possible to recover and recycle phosphates from a phosphate-adsorbed phosphate adsorbent.

When waste water contains phosphates and nitrogen components (e.g., nitrates and nitrites), phosphates and nitrogen components may be recovered by treatment with the desorbing solution.

The metal hydroxide complex shows endothermic peaks at about 380° C. and about 430° C. based on an endothermic reaction accompanied by decomposition during heat-treatment of the complex at about 250–550° C. The metal hydroxide complex, after phosphate desorption, may be calcinated at a temperature of decomposition or above, i.e., about 430–600° C., but preferably at about 550° C., thus generating a metal hydroxide complex without an anionic residue acting as an ion-exchange group.

By utilizing the fact a metal oxide complex is converted into a metal hydroxide complex when brought into contact with an anion-containing electrolyte solution, a metal hydroxide complex having n-valent anion as an ion-exchange group may be regenerated by stirring a metal oxide complex in an electrolyte solution containing n-valent anion. Such electrolyte solutions include sodium chloride, potassium chloride, ammonium chloride and lithium chloride, but preferably sodium chloride because of low cost. A concentration of the electrolyte solution ranges from about 0.5 M to about 5 M, and regeneration time ranges from about 2 to about 4 hours. Regeneration of a phosphate-adsorbed phosphate adsorbent may be accomplished after treatment of waste water by use of a metal oxide complex.

Because a metal hydroxide complex and a metal oxide complex may be dissolved in an acidic solution with pH of 5 or less, recycling of the acidic solution as a raw material is necessary for regeneration of the metal hydroxide complex. The acidic solutions include hydrochloric acid, aluminum chloride, ferric chloride, preferably hydrochloric acid.

Regeneration of the metal hydroxide complex after acid treatment may be easily carried out according to a document (Langmuir, 9, 1418–1422 (1993)).

The dephosphorization capacity of the phosphate adsorbent is efficiently regenerated by using a phosphate ion desorbing solution. The phosphate adsorbent, after phosphate adsorption, may be regenerated in a phosphate ion desorbing solution containing one or more alkaline metal salts and alkaline earth metal salts, except for alkaline metal carbonates. Preferable alkaline metal salts used in the regeneration process include sodium hydroxide, potassium hydroxide, lithium hydroxide, sodium chloride, potassium chloride and lithium chloride, but preferably sodium hydroxide and sodium chloride. Preferable alkaline earth metal salts used in the regeneration process include magnesium chloride, magnesium sulfate, magnesium nitrate, calcium chloride and calcium nitrate, but preferably magnesium chloride and magnesium sulfate. The regeneration process may comprise a treatment with an aqueous solution of alkaline earth metal salts in combination for several times.

According to the invention, phosphates in waste water may be adsorbed efficiently by using a phosphate adsorbent containing a metal hydroxide complex with a large phosphate adsorption capacity. Phosphates may be recovered an recycled efficiently with low cost, and the phosphate adsorbent may be regenerated. The method and agent of the invention may be applied to a variety of equipment utilized in waste water treatment and purification, and also may miniaturize the equipment to lower maintenance frequency and cost when applied to a family-type waste water treatment such as septic tank. In particular, the phosphate adsorbent may be regenerated so that a secondary environmental pollution will not be caused by disposal of the phosphate adsorbent. Phosphates adsorbed may be recovered and recycled as resources, which is very effective from the viewpoint of prevention of eutrophication and water-related environmental protection.

In addition, the agent for waste water treatment of the waste water treatment of the invention is very preferable, because the agent may remove both phosphates and nitrogen components such as nitrates and nitrites.

EXAMPLES

The invention will be described below in detail using examples, but the invention is in no way limited to the examples.

Example 1

A 20 g of phosphate adsorbent ($Mg^{2+}_{0.665}Fe^{3+}_{0.335}(OH^-)_{2.099}Cl^-_{0.1224}(CO_3^{2-})_{0.056}$; hereinafter referred to as "Cl/HT-Fe") was added to an aqueous solution of $Na_2HPO_4$ (1600 cm$^3$) having a phosphate concentration of 26.7 mM-P, and the mixture was stirred at 25° C. for 4 hours. After stirring, the phosphate adsorbent was filtered off. A phosphate ion concentration in the filtrate was determined by molybdenum blue method.

The amount of adsorbed phosphate ion was calculated as adsorption per 1 g of the phosphate adsorbent by subtracting remaining phosphate ion concentration after adsorption equilibrium from initial phosphate ion concentration. A pH of the aqueous solution during phosphate ion adsorption was adjusted to pH 6.93.

The adsorbed amount of phosphorus is 1.17 mmolP/g.

When another phosphate adsorbent ($Mg^{2+}_{0.683}Al^{3+}_{0.317}(OH^-)_{2.033}Cl^-_{0.238}(CO_3^{2-})_{0.023}$; hereinafter referred to as "Cl/HT-Al") was evaluated in place of Cl/HT-Fe in the same manner as above, the adsorbed amount of phosphorus is 2.13 mmolP/g.

Example 2

In order to desorb phosphate, 16 g of the phosphate-containing phosphate adsorbent obtained in example 1 (hereinafter referred to as "P/HT-Fe" and "P/HT-Al") was added to 2M-$Na_2CO_3$ aqueous solution (1280 cm$^3$), respectively, to exchange phosphate ion for carbonate ion. After stirring at 90° C. for 4 hours, each phosphate adsorbent was filtered off. After washing with water, drying and dissolving in hydrochloric acid solution, a phosphate ion concentration of the filtrate was determined in the same manner as example 1 to calculate the remaining phosphorus in the phosphate adsorbents. With respect to P/HT-Fe and P/HT-Al, the remaining phosphorus concentrations are determined 0.09 mmolP/g and 0.29 mmolP/g, respectively, indicating that about 90% of phosphorus are desorbed in each sample.

Example 3

The phosphate adsorbents obtained in example 2 after phosphate desorption (hereinafter referred to as "$CO_3$/HT-Fe" and "$CO_3$/HT-Al") was calcinated at 550° C. for 3 hours to prepare metal oxide complex. The metal oxide complex powders were subjected to X-ray diffraction analysis. The results of the analysis demonstrate that the metal oxide complexes have X-ray patterns caused by magnesium oxide structure.

Example 4

A 5 g of each metal oxide complex (hereinafter referred to as "MgFeO" and "MgAlO", respectively) was added to 5M-NaCl aqueous solution (400 cm$^3$), respectively. The resulting mixtures were stirred at 90° C. for 4 hours. After filtration, washing with water and drying, the resulting powders were subjected to X-ray diffraction analysis. The results of the analysis demonstrate regeneration of metal hydroxide complexes (Cl/HT-Fe and Cl/HT-Al), respectively.

Example 5

The regenerated phosphate adsorbent (Cl/HT-Fe) obtained in example 4 (1 g) was added to an aqueous solution of $Na_2HPO_4$ (80 cm$^3$) having a phosphate concentration of 26.7 mM-P, and the mixture was stirred at 25° C. for 4 hours. After stirring, the phosphate adsorbent was filtered off. A phosphate ion concentration of the filtrate was determined in the same manner as example 1 to determine adsorption of phosphate ion. The adsorbed amount of phosphorus is 1.00 mmolP per 1 g of the regenerated phosphate adsorbent (Cl/HT-Fe). The adsorbed amount (1.00 mmolP/g) corresponds to about 85% of the initial phosphate adsorbent (1.17 mmolP/g).

Example 6

A 3 g of the metal hydroxide complex and 3 g of the metal oxide complex obtained in examples 2 and 3 were dissolved in a 6N-hydrochloric acid solution, respectively, to prepare a mixed solution (100 ml) of $MgCl_2+FeCl_3$ (Mg/Fe molar ratio=1.99) and a mixed solution (100 ml) of MgCl2+AlCl3 (Mg/Al molar ratio=2.15). The mixed solutions were boiled to remove carbon dioxide. Metal hydroxide complexes Cl/HT-Fe ($Mg^{2+}_{0.651}Fe^{3+}_{0.349}(OH^-)_{2.183}Cl^-_{0.090}(CO_3^{2-})_{0.038}$ and Cl/HT-AL ($Mg^{2+}_{0.676}Al^{3+}_{0.324}(OH^-)_{2.082}Cl^-_{0.214}(CO_3^{2-})_{0.014}$) were then prepared according to a method described by Langmuir, 9, 1418–1422 (1993). The adsorbed amounts of phosphorus determined in the same manner as example 1 are 0.97 mmolP/g with respect to Cl/HT-Fe and 2.13 mmolP/g with respect to CL/HT-AL, respectively.

Example 7

The metal oxide complexes (1 g) obtained in example 3 were added to a $Na_2HPO_4$ aqueous solution (80cm$^3$) having a phosphate concentration of 26.7 mM-P, and the mixture was stirred at 25° C. for 4 hours, respectively. After stirring, each phosphate adsorbent was filtered off. Phosphate ion concentrations of filtrates determined in the same manner as example 1 are 1.00 mmolP/g with respect to MgFeO) and 0.87 mmolP/g with respect to MgAlO.

For the purpose of desorption of phosphate, 0.3 g of phosphate-containing phosphate adsorbents obtained (hereinafter referred to as "P/MgFeO" and "P/MgAlO") were added to 2M-$Na_2CO_3$ aqueous solution (24 cm$^3$), respectively, to exchange phosphate ion for carbonate ion. After stirring at 90° C. for 2 hours, each phosphate adsorbent was filtered off. After washing with water, drying and dissolving in hydrochloric acid solution, phosphate ion concentrations of the filtrates were determined in the same manner as example 1 to calculate the remaining phosphorus in the phosphate adsorbents. With respect to P/MgFeO and P/MgAlO, the remaining phosphorus are determined as 0.10 mmolP/g and 0.47 mmolP/g, respectively, indicating that phosphorus of P/MgFeO was desorbed about 90%, and that phosphorus of P/MgAlO was desorbed about 46%. The phosphate adsorbent powders after phosphate desorption treatment were subjected to X-ray diffraction analysis. The results of the analysis demonstrate that $CO_3$/HT-Fe and $CO_3$/HT-Al structures are regenerated. The regenerated phosphate adsorbents may be used according to the methods of examples 3, 4 or 6.

Example 8

A 0.01 g of phosphate adsorbent, Cl/HT-Fe or Cl/HT-Al was added to model waste water (40 ml) containing a variety of ions (2.0 ppm-P; 10.4 ppm-$NO_2^-$; 7.0 ppm-$NO_3^-$; and 16.5 ppm-$SO_4^{2-}$). The mixture was stirred at room temperature for 4 hours. After stirring, the phosphate adsorbent was filtered off. A phosphate ion concentration in the filtrate was determined in the same manner as example 1, and other ions in the filtrate were determined by ion chromatography. The results are shown in table 1. Table 1 demonstrates that not only phosphate but also other ions are significantly reduced by treating the model waste water with the phosphate adsorbents.

TABLE 1

| Agent for treating | Ion concentration (ppm) | | | |
|---|---|---|---|---|
| waste water | P | $NO_2^-$ | $NO_3^-$ | $SO_4^{2-}$ |
| Cl/HT-Fe | 0.7 | 2.9 | 1.5 | 12.1 |
| Cl/HT-Al | 0.2 | 2.4 | 1.1 | 8.0 |

Example 9

A 0.5 g of the phosphate-containing phosphate adsorbent (P/HT-Al) was added to an Erlenmeyer flask with ground stopper to which a 6% NaOH+30% NaCl mixed solution (20 ml) was added. The mixture was shaken laterally (170 shake/min) for 4 hours. The phosphate adsorbent was filtered off and the agent was washed with water. The phosphate adsorbent was subjected to the shaking treatment as above using 79.3% $MgCl_2$ aqueous solution. The amount of desorbed phosphate ion was calculated as adsorption per 1 g of the phosphate adsorbent by determining a phosphate concentration of the filtrate according to the method of example 1. The desorbed amount of phosphorus is 1.73 mmolP/g.

Example 10

The desorbed amount of phosphorus is determined in the same manner as example 9 except that the phosphate adsorbent was treated with 3% NaOH aqueous solution and 79.3% $MgCl_2$ aqueous solution in this sequence as solution for desorption.

The desorbed amount of phosphorus is 1.50 mmolP/g.

Example 11

The regenerated phosphate adsorbents obtained in examples 9 and 10 were treated in the same manner as example 1 to determine the adsorbed amount of phosphorus. The adsorbed amounts of phosphorus are 1.79 mmolP/g (example 9) and 1.65 mmolP/g (example 10). The regeneration percents of phosphate adsorbents are as high as 84% and 77% based on the saturated phosphorus adsorption of the phosphate adsorbent Cl/HT-Al, 2.13 mmolP/g.

Example 12

A suitable amount of polyacrylic hydrazide and polyamide/epichlorohydrin resin as a binder were added to 4 kg of phosphate adsorbent (Cl/HT-Al). The resulting mixture was kneaded with a kneader (output=1.5 kw; total volume=20 liter; binary shaft number of revolution=29.20 rpm) under conditions of mixing time between phosphate adsorbent and binder (=1 minute) and kneading time after adding a required amount of water (=5 minutes). Granulates (diameter=3 mm; length 5–10 mm) were prepared with upstroke-type extrusion granulators (output=3.7 kw; screen=3 mm; number of revolution =135 rpm), and the granulates were dried at 80° C. for 15 hours.

Example 13

The granulates obtained in example 12 were subjected to a strength test and a phosphate-adsorption test. The strength test was carried out according to the following procedure. A 1.0 g of accurately weighed granulates and 20 ml of water were added to an Erlenmeyer flask with ground stopper. The flask was shaked with lateral-shake thermostat at 30° C., 170 shake/min for 3 hours. After filtration and drying, a total weight of the granulates were determined. The resulting granulates were sieved with 10-mesh sieve to weigh residue on sieve and sieve-passed fraction. Crushing resistance strength (L) is calculated by the following equation. Crushing resistance strength=$100-\{P/(S+P)\} \times 100$ wherein P=weight of 10-mesh sieve-passed fraction; and S=weight of residue on 10-mesh sieve. Crushing resistance strength is practically needed to be at about 85 or more.

The phosphate adsorption test was conducted according to the following procedure.

A 1.0 g of granulates was accurately weighed and added to an Erlenmeyer flask with ground stopper. A 20 ml of the aqueous solution of $Na_2HPO_4$ used in example 1 was added thereto. The flask was laterally shaked at 30° C., 170 shake/min for 3 hours. After filtration, a phosphate concentration of the filtrate was determined in the same manner as example 1 to calculate the amount of phosphate adsorbed. The results were shown in table 2.

TABLE 2

| Binder | Loading of Binder (wt. %) | Capacity of granulator (kg/hr) | Adsorbed phosphate (mmolP/g) | Crushing resistance strength |
|---|---|---|---|---|
| Polyacrylic hydrazide | 1.0 | 70 | 0.69 | 86.4 |
| Polyacrylic hydrazide | 3.0 | 60 | 0.60 | 99.5 |
| Polyamide epichlorohydrine resin | 5.0 | 150 | 1.28 | 33.5 |
| Polyacrylic hydrazide | 1.0 | | | |

TABLE 2-continued

| Binder | Loading of Binder (wt. %) | Capacity of granulator (kg/hr) | Adsorbed phosphate (mmolP/g) | Crushing resistance strength |
|---|---|---|---|---|
| Polyamide epichloro-hydrine resin | 4.0 | 110 | 0.67 | 97.3 |

The results of table 2 show that the phosphate adsorbent of the invention meets the waste water quality standard with respect to a septic tank, sewage, and other waste water. The phosphate adsorbent of the invention will be applicable to the more strict standard.

Example 14

Figure 1:
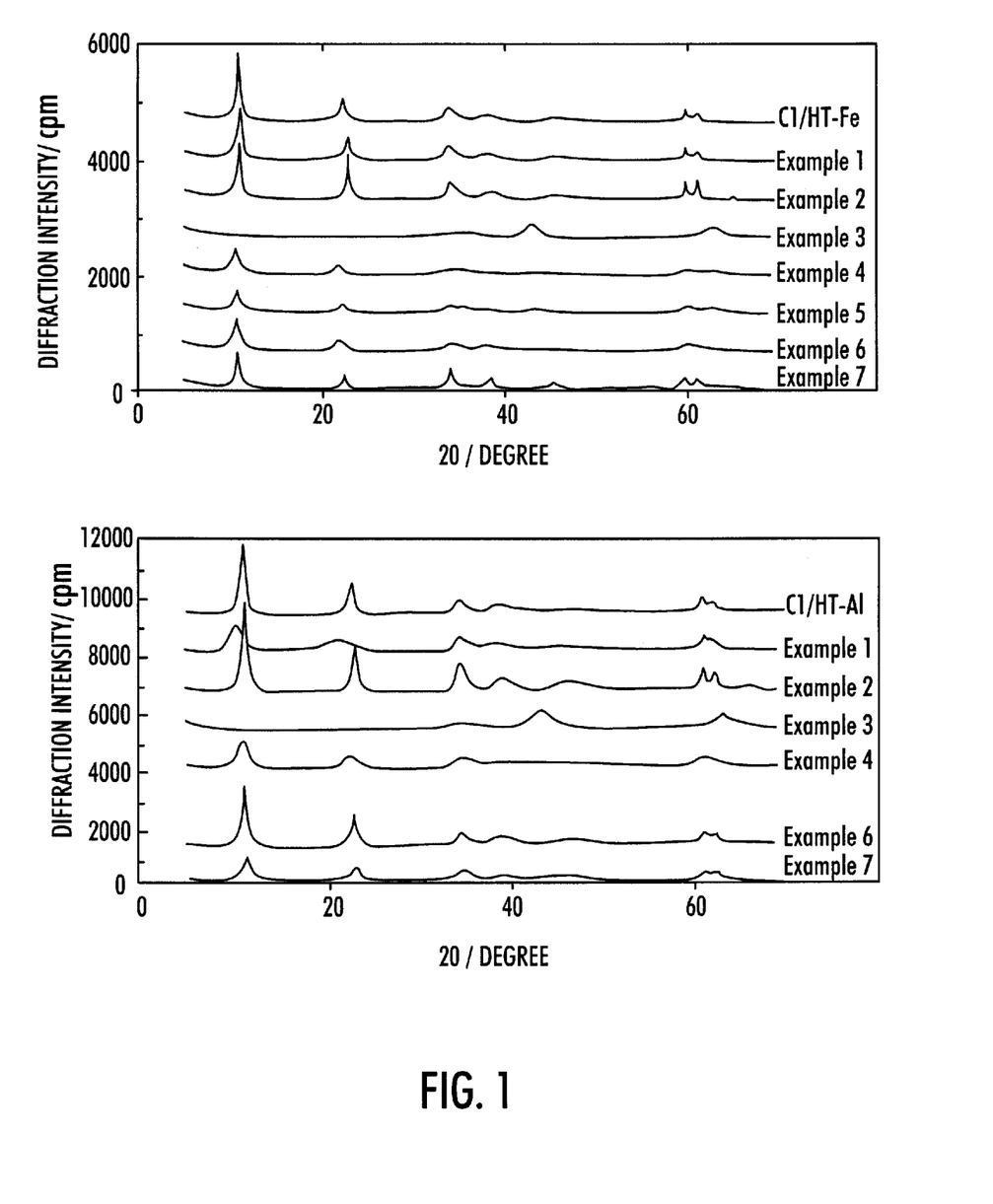
FIG. 1 demonstrates results of X-ray diffraction with respect to samples obtained in examples 1–7.
Figure 2:
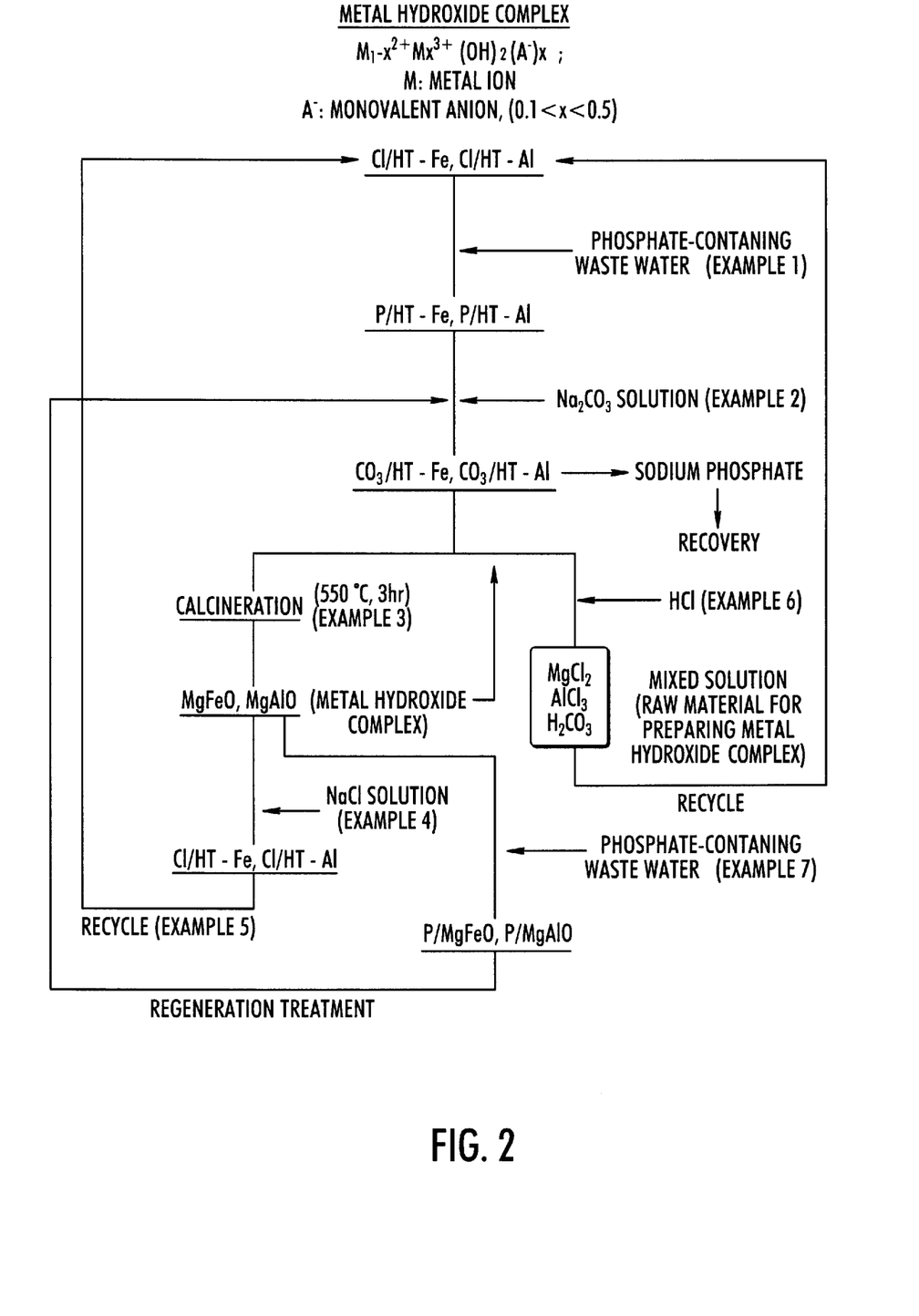
FIG. 2 is a flow chart showing a method for treating phosphate-containing waste water in the order conducted.
Figure 3:
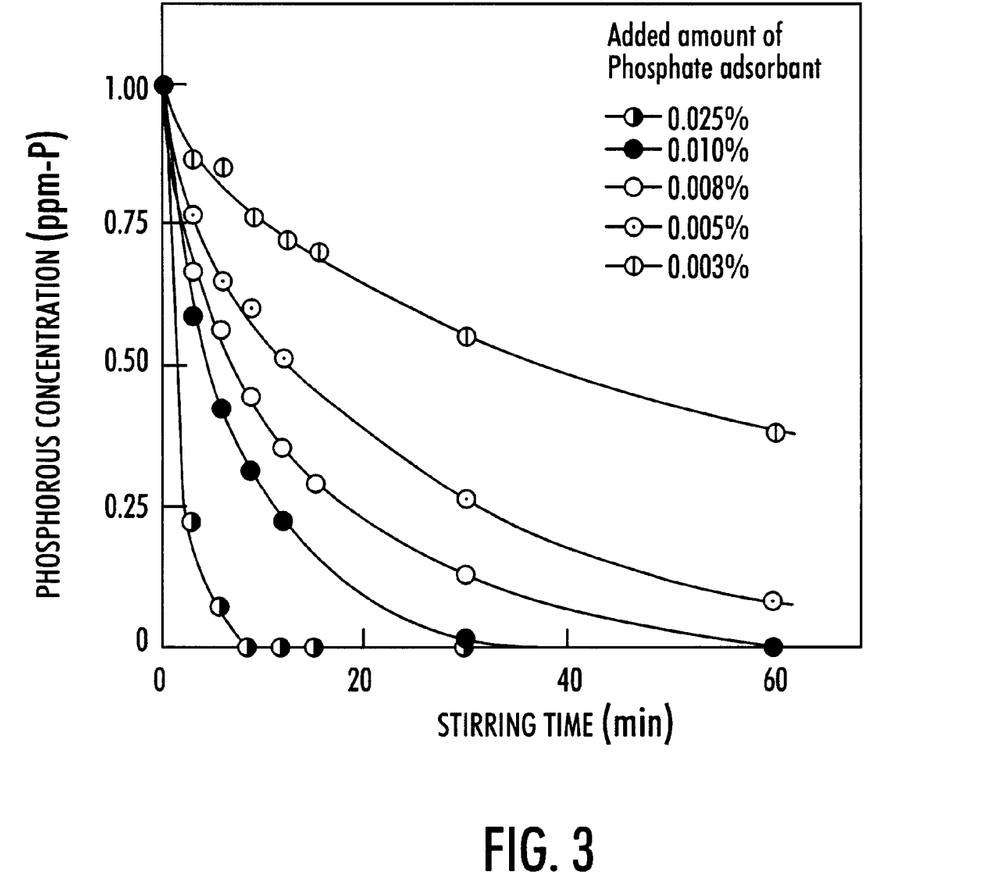
FIG. 3 is a chart showing the relationship between a phosphorous concentration and a stirring time.

The granulates obtained in example 12 were ground product. A predetermined amount of the ground product (particle size: 200–280 mesh) was added to an aqueous $NaH_2PO_4$ solution (2,000 ml, pH=6.8) adjusted to a phosphorous concentration of 1 ppm-P, and the resulting mixture was stirred at 25° C. so as to determine the change of a phosphorous concentration relative to a stirring time. Determination of the phosphorous concentration were carried out in the same manner as example 1. The results are shown in FIG. 3. FIG. 3 shows that a rate of phosphate adsorption increases with the addition of the ground product and that phosphate was removed and adsorbed within 10 minutes from the addition of the phosphate adsorbent (0.025%) thereto.

Example 15

Phosphate adsorption capacity of a phosphate adsorbent was evaluated using waste water with a low phosphate concentration. The waste water was collected from equipment for waste water treatment located in a farm area in KASHIMA-cho, SHIMANE-ken JAPAN. The phosphate adsorbent (Cl/Ht-Al, 0.1 g) was added to the waste water (400 ml). The resulting mixture was stirred with a magnetic stirrer for 4 hours. After stirring, the treated water was filtered with a 0.45 μm-membrane filter to analyze the phosphate concentration of the filtrate according to the assay method defined by Japanese Industrial Standard (JIS). The phosphate concentration of the waste water (0,18 ppm-P) was decreased by the treatment below a detection limit of phosphate showing usefulness of the phosphate adsorbent of the invention when applied to waste water with low phosphate concentration.

We claim:

1. An agent for removing phosphates, nitrates and nitrites from waste water comprising a metal hydroxide complex as a phosphate adsorbent represented by the formula:

wherein $M^{2+}$ is at least one divalent metal ion selected from the group consisting of $Mg^{2+}$, $Ni^{2+}$, $Zn^{2+}$, $Fe^{2+}$, $Ca^{2+}$ and $Cu^{2+}$; $M^{3+}$ is at least one trivalent metal ion selected from the group consisting of $Al^{3+}$ and $Fe^{3+}$; $A^{n-}$ is an n-valent anion; x is in the range $0.1 \leq x \leq 0.5$; y is in the range $0.1 \leq y \leq 0.5$; and n is 1 to 2.

2. A granulate of phosphate adsorbent for treating phosphate-containing waste water comprising about 99–60% by weight of a metal hydroxide complex as a phosphate adsorbent represented by the formula:

wherein $M^{2+}$ is at least one divalent metal ion selected from the group consisting of $Mg^{2+}$, $Ni^{2+}$, $Zn^{2+}$, $Fe^{2+}$, $Ca^{2+}$ and $Cu^{2+}$; $M^{3+}$ is at least one trivalent metal ion selected from the group consisting of $Al^{3+}$ and $Fe^{3+}$; $A^{n-}$ is an n-valent anion; x is in the range $0.1 \leq x \leq 0.5$; y is in the range $0.1 \leq y \leq 0.5$; n is 1 or 2; and about 1–40% by weight of binder.

3. The granulate according to claim 2 wherein said binder comprises an aminated polyacrylamide.

4. The granulate according to claim 2 wherein said binder comprises about 99–60% by weight of an aminated polyacrylamide and about 1–40% by weight of at least one selected from the group consisting of polyamide/epichlorohydrin resin, vinyl acetate/vinyl versate copolymer resin and styrene/acryl resin.

5. The granulate of phosphate adsorbent for treating phosphate-containing waste water according to claim 2, wherein x and y are in the range $0.2 \leq x, y \leq 0.4$.

6. The granulate of phosphate adsorbent for treating phosphate-containing waste water according to claim 2, wherein x and y are in the range $0.2 \leq x, y \leq 0.35$.

* * * * *

UNITED STATES PATENT AND TRADEMARK OFFICE
CERTIFICATE OF CORRECTION

PATENT NO. : 5,976,401
DATED : November 2, 1999
INVENTOR(S) : Suzuki et al.

It is certified that error appears in the above-identified patent and that said Letters Patent are hereby corrected as shown below:

On the cover of the patent, item [30], an additional priority document was claimed. This application also claims reference to Japanese Patent Application No. 9-155276, filed June 12, 1997.

Claim 2, line 5, "$OH^{31}$" should be "$OH^-$"

Signed and Sealed this

Third Day of April, 2001

Attest:

NICHOLAS P. GODICI

Attesting Officer

Acting Director of the United States Patent and Trademark Office